United States Patent
Lee et al.

(10) Patent No.: US 10,084,834 B2
(45) Date of Patent: Sep. 25, 2018

(54) RANDOMIZATION OF PACKET SIZE

(71) Applicant: Electronics and Telecommunications Research Institute, Daejeon (KR)

(72) Inventors: Soo Jeon Lee, Daejeon (KR); Won Chan Jung, Daejeon (KR); Byoung Sun Lee, Daejeon (KR); Do Seob Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 242 days.

(21) Appl. No.: 14/288,035

(22) Filed: May 27, 2014

(65) Prior Publication Data
US 2014/0348180 A1    Nov. 27, 2014

(30) Foreign Application Priority Data

May 27, 2013    (KR) .................. 10-2013-0059468
Apr. 3, 2014    (KR) .................. 10-2014-0039905

(51) Int. Cl.
| H04J 3/16 | (2006.01) |
| H04L 29/06 | (2006.01) |
| H04L 12/805 | (2013.01) |
| H04L 12/801 | (2013.01) |

(52) U.S. Cl.
CPC ............ *H04L 65/60* (2013.01); *H04L 47/365* (2013.01); *H04L 47/11* (2013.01)

(58) Field of Classification Search
None
See application file for complete search history.

(56) References Cited

U.S. PATENT DOCUMENTS

| 5,191,583 A * | 3/1993 | Pearson ............... H04L 1/0007 |
| | | 370/242 |
| 6,438,101 B1 * | 8/2002 | Kalampoukas ......... H04L 47/10 |
| | | 370/229 |
| 6,625,764 B1 | 9/2003 | Dawson |
| 6,757,255 B1 * | 6/2004 | Aoki ..................... H04L 1/187 |
| | | 370/229 |
| 8,565,242 B2 * | 10/2013 | Wu ....................... H04L 47/10 |
| | | 370/232 |
| 8,990,422 B1 * | 3/2015 | Usmani ............... H04L 69/166 |
| | | 709/226 |
| 2001/0015956 A1 * | 8/2001 | Ono ..................... H04L 1/0007 |
| | | 370/229 |
| 2002/0071388 A1 * | 6/2002 | Bergsson ........... H04L 43/0888 |
| | | 370/230 |
| 2002/0150048 A1 * | 10/2002 | Ha ........................ H04L 1/1887 |
| | | 370/231 |

(Continued)

FOREIGN PATENT DOCUMENTS

| CN | 1812413 A | 8/2006 |
| CN | 101848224 A | 9/2010 |
| EP | 1950904 A1 * | 7/2008 ............. H04L 1/187 |

*Primary Examiner* — Candal Elpenord
*Assistant Examiner* — Juvena Loo
(74) *Attorney, Agent, or Firm* — William Park & Associates Ltd.

(57) ABSTRACT

A method of randomizing a size of a packet is provided. A randomization method may include recognizing a maximum segment size (MSS) defined for transmission and reception of a packet with a reception terminal, and randomizing a size of the packet to be less than the MSS.

16 Claims, 13 Drawing Sheets

(56) References Cited

U.S. PATENT DOCUMENTS

| | | | |
|---|---|---|---|
| 2003/0063564 A1* | 4/2003 | Ha | H04L 12/5692 370/230 |
| 2003/0133427 A1* | 7/2003 | Cimini, Jr. | H04W 28/06 370/338 |
| 2003/0149785 A1* | 8/2003 | Gerla | H04L 29/06 709/232 |
| 2003/0161321 A1* | 8/2003 | Karam | H04L 45/124 370/395.21 |
| 2004/0179473 A1 | 9/2004 | Thibodeau et al. | |
| 2004/0215753 A1* | 10/2004 | Chan | H04L 1/1887 709/223 |
| 2005/0165948 A1* | 7/2005 | Hatime | H04L 47/10 709/235 |
| 2005/0213586 A1* | 9/2005 | Cyganski | H04L 41/0896 370/395.41 |
| 2005/0226150 A1* | 10/2005 | Santos | H04L 47/10 370/230 |
| 2005/0254420 A1* | 11/2005 | Wager | H04L 29/06 370/230 |
| 2006/0291435 A1* | 12/2006 | Hirsimaki | H04L 29/06 370/338 |
| 2007/0025395 A1* | 2/2007 | Cardona | H04L 69/16 370/474 |
| 2008/0025216 A1* | 1/2008 | Singh | H04L 47/10 370/231 |
| 2012/0011271 A1* | 1/2012 | Zhao | H04L 67/2842 709/234 |
| 2012/0063449 A1* | 3/2012 | Frederic | H04L 69/162 370/389 |
| 2014/0140352 A1* | 5/2014 | Isobe | H04L 47/27 370/413 |

* cited by examiner

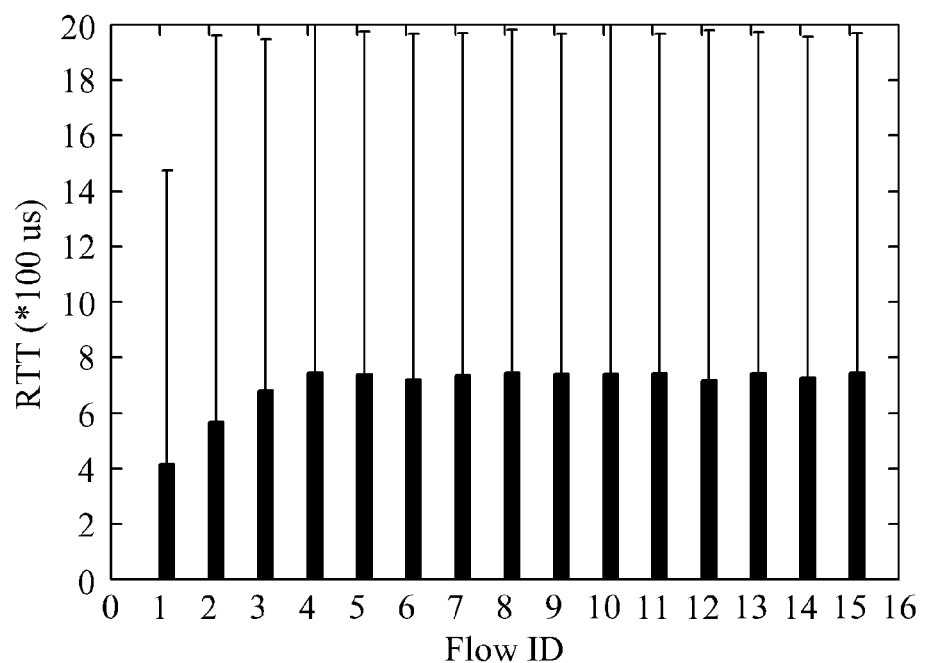

FIG. 4 (RELATED ART)

| Techniques | Fairness property |
|---|---|
| RED | RTT bias |
| SFQ | RTT fairness |
| TCP Pacing | Inverse RTT bias |
| Equal-length routing | RTT fairness |

RANDOMIZATION OF PACKET SIZE

CROSS-REFERENCE TO RELATED APPLICATIONS

This application claims the benefit of Korean Patent Application No. 10-2013-0059468 and Korean Patent Application No. 10-2014-0039905, respectively filed on May 27, 2013 and Apr. 3, 2014, in the Korean Intellectual Property Office, the disclosures of which are incorporated herein by reference.

BACKGROUND

1. Field of the Invention

The present invention relates to a packet size randomization method, and more particularly, to a method of randomizing a size of a packet in a transmission terminal that receives and transmits the packet from and to a reception terminal 2. Description of the Related Art In a data center, use of a many-to-one transmission pattern, for example MapReduce, is increasing. Data flows may compete with each other in an ingress point in a receiver. For example, in a low-price switch that is widely used in the data center, a drop-tail queuing policy may be used. Accordingly, packet drop may occur fairly in input ports of the ingress point.

However, when a number of data flows input to an input port X is lower than a number of data flows input to an input port Y, the data flows input to the input port X may cause a transmission control protocol (TCP) timeout to occur, which may result in a serious loss in a TCP throughput. The above phenomenon may be referred to as a TCP outcast problem.

Accordingly, it is desire to develop a technology for solving a TCP outcast problem.

SUMMARY

An aspect of the present invention provides a method of randomizing a size of a packet in a transmission terminal that transmits and receives the packet to and from a reception terminal.

According to an aspect of the present invention, there is provided a randomization method of a transmission terminal, the randomization method including: recognizing a maximum segment size (MSS) defined for transmission and reception of a packet with a reception terminal; and randomizing a size of the packet to be less than the MSS.

The randomizing may include determining a degree of randomization.

The determining may include receiving a parameter used to adjust the degree of randomization, and determining the degree of randomization based on the received parameter.

The determining may include determining, by the transmission terminal, a parameter used to adjust the degree of randomization.

The randomization method may further include collecting randomization-related information to determine the degree of randomization.

The randomization-related information may include at least one of multiplier information and congestion window information.

The determining may include collecting the multiplier information through a parameter of a transmission control protocol (TCP) stack in a kernel of an operating system (OS).

The determining may further include determining whether a timeout occurs during the transmission and reception of the packet, based on a change in at least one of the multiplier information and the congestion window information.

The determining may include determining that the timeout does not occur when the multiplier information has a first numerical value, or determining that the timeout occurs when the multiplier information has a second numerical value.

The determining may include determining that timeouts consecutively occur during the transmission and reception of the packet when a numerical value of each of at least one of the multiplier information and the congestion window information increases.

The determining may include determining the degree of randomization based on a numerical value of each of at least one of the multiplier information and the congestion window information.

The degree of randomization may include at least one of a maximum randomized value, a minimum randomized value, an expected value of a randomized value, and a standard deviation of a distribution of randomized values.

The randomizing may include adjusting a size of a payload of the packet through a randomization function in a transport layer.

The randomization method may further include transmitting the packet of which the size of the payload is adjusted to a lower layer.

The randomizing may include, when a TCP segmentation offload (TSO) is enabled, segmenting a segment that has a size greater than the MSS and that is received from an upper layer.

The randomizing may include performing randomization based on a randomization algorithm in at least one of a router and a switch that are defined in software.

According to another aspect of the present invention, there is provided a randomization method of a transmission terminal, the randomization method including: monitoring at least one of congestion window information and multiplier information of a TCP stack in a kernel of an OS; determining whether a size of a packet transmitted to a reception terminal is randomized, based on a result of the monitoring; and transmitting the packet to the reception terminal.

The determining may include, when at least one of the multiplier information and the congestion window information has a first numerical value, determining that the size of the packet is not randomized When at least one of the multiplier information and the congestion window information has a second numerical value, the size of the packet may be randomized. When a value of each of at least one of the multiplier information and the congestion window information increases, a degree of randomization may increase.

According to another aspect of the present invention, there is provided a transmission terminal, including: a controller to recognize an MSS defined for transmission and reception of a packet with a reception terminal, and to randomize a size of the packet to be less than the MSS; and a communication unit to transmit the packet to the reception terminal.

According to various embodiments, there is provided a packet size randomization method of a transmission terminal that randomizes a size of each of at least one of a header and a payload of a packet and that transmits and receives the packet to and from a reception terminal. For example, a size of each of at least one of the header and the payload of the packet may be randomized to be less than an MSS and accordingly, a TCP outcast problem may be solved.

Various embodiments may be applied, for example, to a TCP stack of an OS, an offload engine of a network interface card (NIC), a router, a switch, and the like.

Additionally, in the TCP stack of the OS, various embodiments may be applied to a server-level OS, for example Windows or Unix, and the like and accordingly, compatibility may be maximized. When 10 Gigabits per second (Gbps) is generalized due to an increase in a transmission speed, a large segment offload (LSO) of an NIC may be expected to be inevitably used. Various embodiments may be applied to the offload engine of the NIC, and may be used in a hardware market.

Furthermore, various embodiments may be applied to a software-defined router and/or switch, and the like, and may also be actively used for traffic management.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIGS. 3A and 3B are graphs illustrating a relationship between a throughput and a round-trip time (RTT) between a transmission terminal and a reception terminal;

FIG. 4 is a table illustrating an applicable method according to a related art;

DETAILED DESCRIPTION

Figure 1:
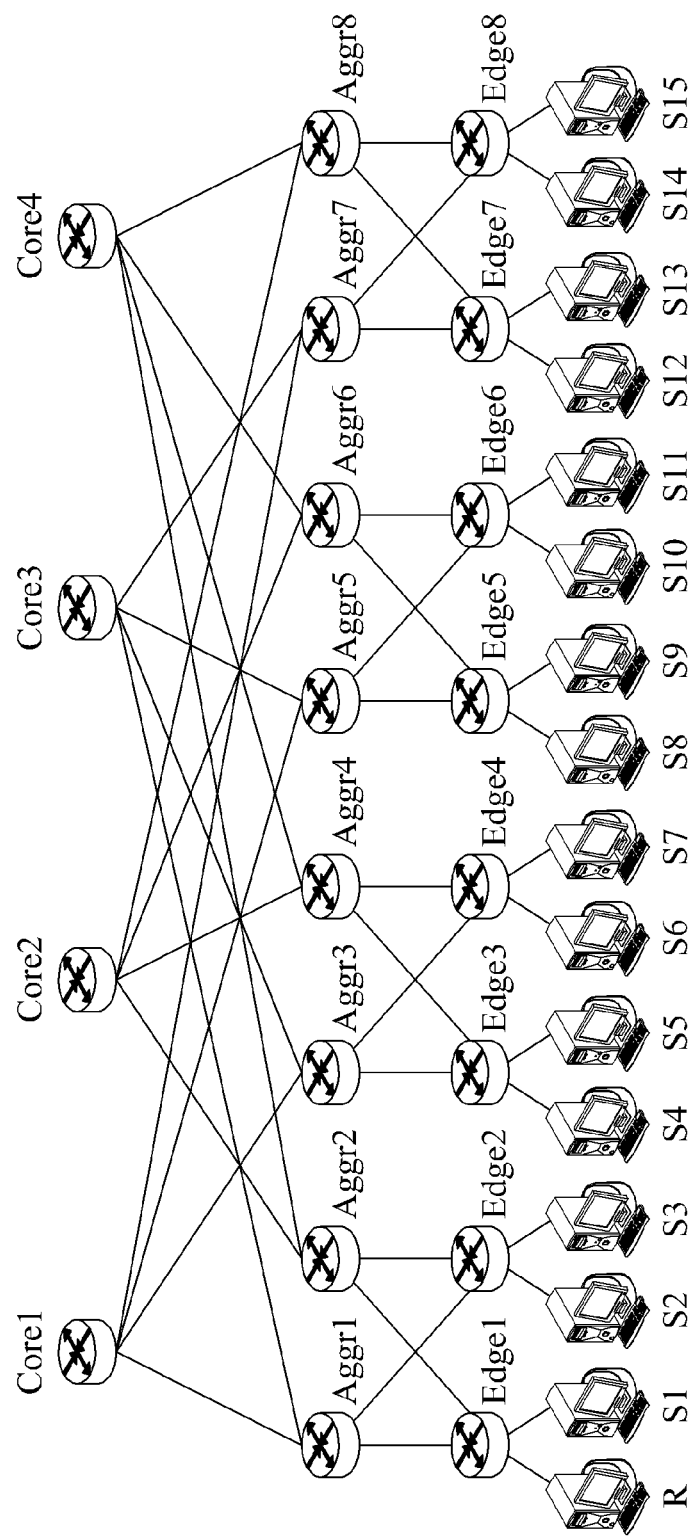
FIG. 1 is a diagram illustrating a topology to which various embodiments are applicable.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a topology to which various embodiments are applicable.

As illustrated in FIG. 1, the topology may include Core1 to Core4, aggregation (Aggr) Aggr1 to Aggr8, Edge1 to Edge8, and terminals R and S1 to S15.

Each of Core1 to Core4 may be connected to Aggr1 to Aggr8. Additionally, each of Aggr1 to Aggr8 may be connected to Edge1 to Edge8. Each of Edge1 to Edge8 may be connected to the terminals R and S1 to S15. Core1 to Core4, Aggr1 to Aggr8, Edge1 to Edge8 and the terminals R and S1 to S15 may form a fat-tree structure. The topology of FIG. 1 may be based on a fat-tree topology, and may be called a multi-rooted and hierarchical topology. The topology of FIG. 1 is merely an example and accordingly, one of ordinary skill in the art may easily understand that embodiments in the present disclosure may be applied to various topologies and there is no limitation to a type of applied topologies.

Core1 to Core4, Aggr1 to Aggr8, and Edge1 to Edge8 may be switches forming a topology. The terminals R and S1 to S15 may be leaf nodes of a topology that transmit and receive data flows or packets.

In an existing many-to-one transmission application, for example MapReduce, and the like, multiple flows may be concentrated to each of ports of an ingress switch of a reception terminal.

Accordingly, flows may compete with each other to enter a transmission queue of an ingress switch. An existing commercial switch may employ a drop-tail first-in, first-out (FIFO) queuing scheme. In the existing commercial switch, a port blackout may occur. The port blackout may refer to a phenomenon in which packets input to a predetermined port of an ingress switch are consecutively dropped.

Figure 2:
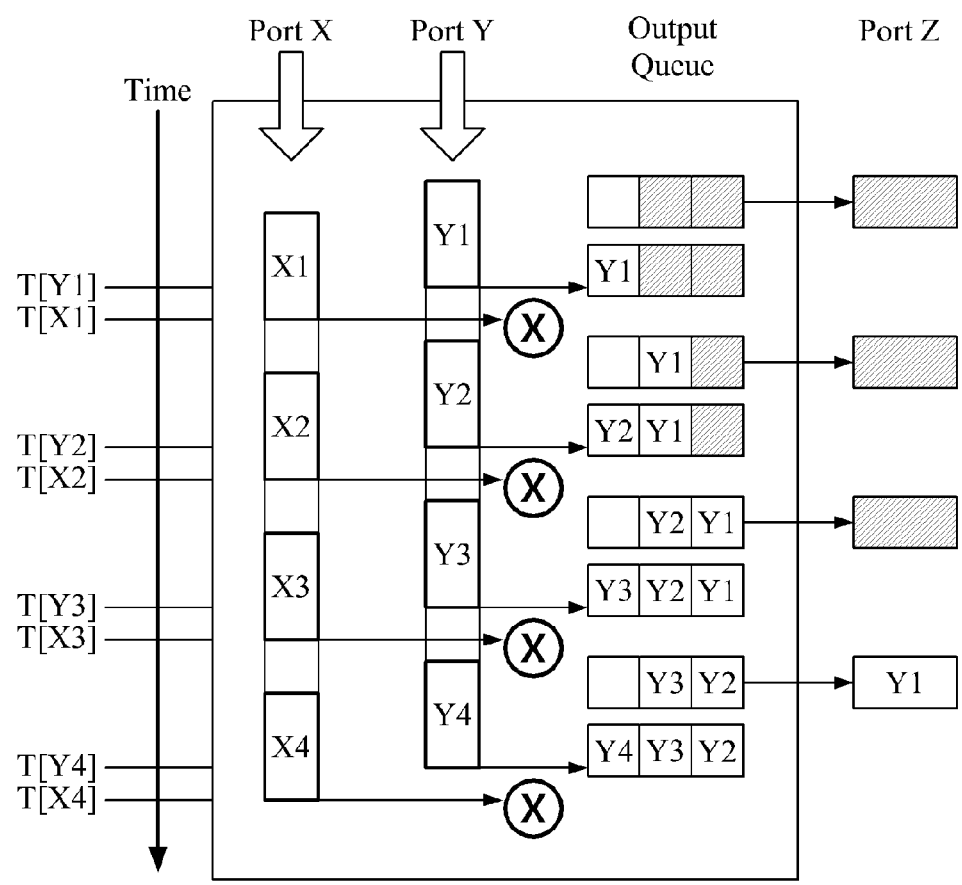
FIG. 2 is a diagram illustrating processing of flows in an ingress switch environment including two input ports, for example input ports X and Y, and a single output port, for example an output port Z, according to a related art.

FIG. 2 is a diagram illustrating processing of flows in an ingress switch environment including two input ports, for example input ports X and Y, and a single output port, for example an output port Z, according to a related art.

An input time in which each of first packets X1, X2, X3, and X4 inputs to the input port X may be different from an input time in which each of second packets Y1, Y2, Y3, and Y4 inputs to the input port Y. In other words, an arrival time of each of the first packets X1, X2, X3, and X4 may be different from an arrival time of each of the second packets Y1, Y2, Y3, and Y4. For example, referring to FIG. 2, arrival times T[Y1], T[Y2], T[Y3], and T[Y4] of the second packets Y1, Y2, Y3, and Y4 may be earlier than arrival times T[X1], T[X2], T[X3], and T[X4] of the first packets X1, X2, X3, and X4. Since a drop-tail FIFO queuing scheme is used in FIG. 2, all the first packets X1, X2, X3, and X4 input to the input port X may be dropped, and as a result, the second packets Y1, Y2, Y3, and Y4 input to the input port Y may be output to the output port Z.

Figure 3A:
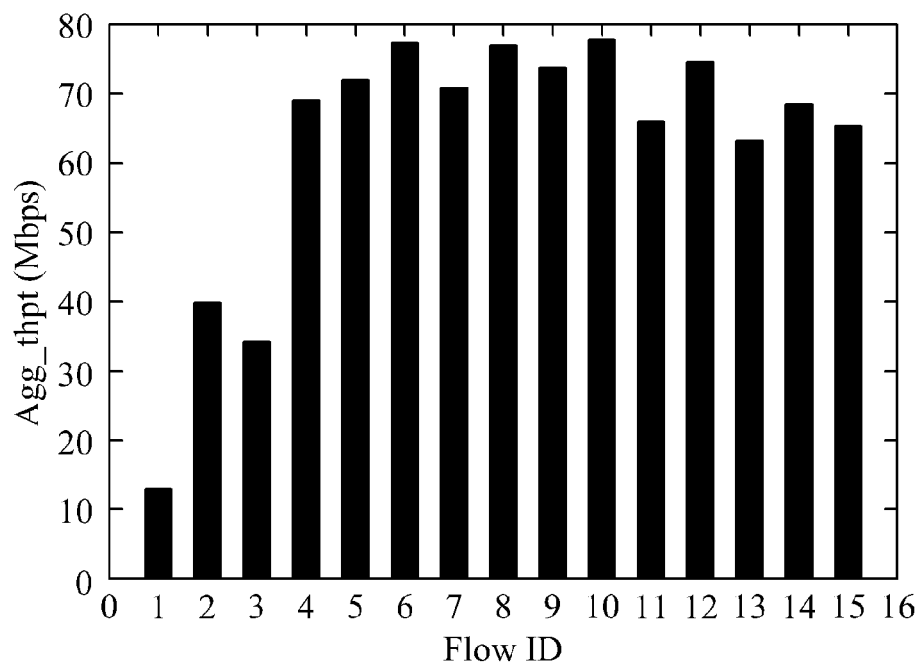

Port blackout may occur in all ports, instead of occurring in only a specific port. However, a TCP timeout may be caused by continuous packet drops and as a result, a sending rate may be rapidly reduced. The above problem may be referred to as a "TCP outcast problem." The TCP outcast problem may be likely to occur in a hierarchical topology, for example, a fat-tree topology. Referring back to FIG. 1, when many-to-one transmission is performed between the terminal R as a reception terminal, and the terminals S1 to S15 as transmission terminals, the following three flows may exist based on a distance between the terminals R and S1 to S15:

1) 2-hop flow: S1->R
2) 4-hop flows: S2->R, S3->R
3) 6-hop flows: [S4,. . . , S15]->R A TCP throughput may typically be inversely proportional to a round-trip time (RTT) between a transmission terminal and a reception terminal. Accordingly, it may be expected that the 2-hop flow may have a greatest throughput and the 6-hop flows may have a lowest throughput, however, a result contrary to expectations may be determined as shown in FIGS. 3A and 3B. FIGS. 3A and 3B are graphs illustrating a relationship between a throughput and an RTT between a transmission terminal and a reception terminal Results of FIGS. 3A and 3B may be associated with port blackout occurring in Edge1 of FIG. 1.

In Edge1, two input ports, for example, Edge1:S1, and Edge1:Aggr1 may be used. Edge1:Aggr2 may be assumed to be a redundant port. For example, a single flow, for example a flow from S1 to R, may be input to Edge Edge1:S1, and 14 flows may be input to Edge1:Aggr1. In this example, port blackout may occur in each of Edge1:S1 and Edge1:Aggr1. Because all packets that are consecutively dropped due to the port blackout may be a portion of the flow from S1 to R in Edge1:S1, the flow from S1 to R may cause a TCP timeout to occur by a TCP congestion control, and may reduce a congestion window size to "1." In other words, a transmission speed may be seriously reduced.

On the other hand, 14 flows may be mixed and input to Edge1:Aggr1. Accordingly, a large loss may not occur in each of the 14 flows, despite consecutive packet drops.

To solve the above problem, a method according to a related art may be tested as shown in FIG. 4. FIG. 4 is a table illustrating an applicable method according to a related art. In a random early detection (RED) technique and a stochastic fair queuing (SFQ) technique, as link layer solutions, drop-tail queuing may not be performed. Accordingly, an outcast problem may not occur.

However, RED equipment may be expensive, and may exhibit RTT bias. Additionally, SFQ equipment may be very expensive, and may hardly be used in a commercial switch. A TCP pacing technique may be used as a transport layer solution, to adjust a time interval between packets during transmission of packets. To apply the TCP pacing technique to the above problem, accuracy in time in microseconds (μs) may need to be secured. However, it may be difficult to realize the TCP pacing technique due to a structure of a central processing unit (CPU) and/or an operating system (OS). An equal-length routing technique may be used as a network layer solution, to divert all flows to the same path. However, in the equal-length routing technique, a detour path may be selected intentionally instead of a shortest path and accordingly, an efficiency of a network may be significantly reduced.

To solve the above-described problems in a related art, a randomization method of randomizing a size of a packet, for example, a size of a payload of a packet according to embodiments may be used.

In a packet size determination method according to a related art, a size of a TCP payload may be set to be equal to a maximum value as a maximum segment size (MSS) at all times. To reduce a header overhead, the above-described payload size determination method may be used. However, when a TCP outcast problem occurs, embodiments of the present disclosure may provide a method of randomizing a TCP payload size within a range less than the MSS to solve the problems in the related art.

Figure 5:
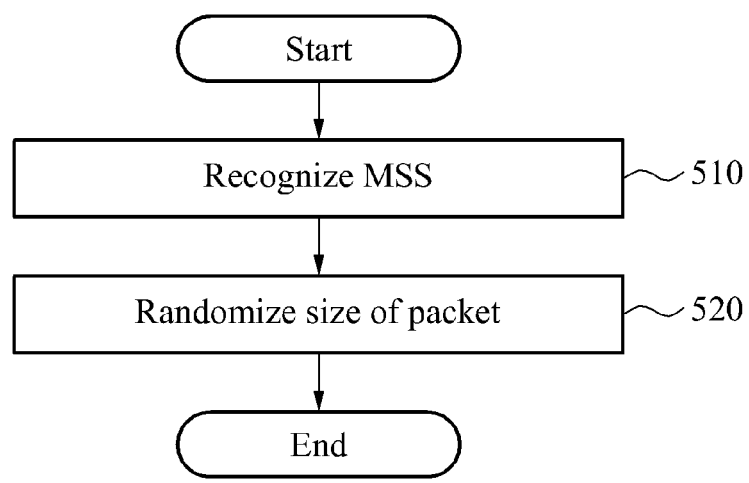
FIG. 5 is a flowchart illustrating a randomization method of a transmission terminal according to an embodiment.

FIG. 5 is a flowchart illustrating a randomization method of a transmission terminal according to an embodiment.

Referring to FIG. 5, in operation 510, the transmission terminal may recognize an MSS that is defined in advance for transmission and reception of a packet with a reception terminal. The MSS may refer to a maximum size allowed during segmenting of the packet.

The transmission terminal and the reception terminal may recognize an MSS during installation of a preset protocol, or may recognize the MSS by exchanging messages to each other. Additionally, the transmission terminal may receive information on the MSS from a manager.

In operation 520, the transmission terminal may randomize a size of the packet to be less than the MSS. For example, the transmission terminal may randomize a size of a payload of the packet to be less than the MSS.

The transmission terminal may determine a size of a payload to be a value between "1" and the MSS. Because a separate fragmentation may be caused by randomization of the size of the packet to be greater than the MSS, the transmission terminal may randomize the size of the packet to be less than the MSS.

The transmission terminal may determine a degree of randomization during randomizing of the size of the payload of the packet. The degree of randomization may include at least one of a maximum randomized value randMAX, a minimum randomized value randMIN, an expected value randEXP of a randomized value, and a standard deviation randSTDV of a distribution of randomized values. The transmission terminal may adjust the degree of randomization using parameters.

The transmission terminal may operate in a manual mode, and may determine the degree of randomization. For example, the transmission terminal may set up the degree of randomization based on a policy of a preset operator. A plurality of TCP parameters may be set to default values in an OS, and may be changed by a system manager or operator, if necessary. Accordingly, the transmission terminal may set up and change the degree of randomization.

In an example, in a data center, a system manager, a program, or a specific algorithm may recognize, in advance, a feature of a specific many-to-one flow. The system manager, the program, or the specific algorithm may analyze, in advance, the degree of randomization specialized for various examples, and the degree of randomization may be manually set based on an analysis result.

In another example, a transmission terminal may operate in an automatic mode, and may determine the degree of randomization. The transmission terminal may collect a variety of randomization-related information to determine the degree of randomization. The transmission terminal may determine the degree of randomization based on the collected randomization-related information. For example, the transmission terminal may collect a TCP multiplier as randomization-related information, and may monitor the TCP multiplier.

This is because it is found as a test result that a multiplier used for backoff during retransmission timeout (RTO) of a TCP is an important factor to cause a TCP outcast problem to occur.

For example, when an acknowledgement (ACK) for a transmitted packet is not received, the transmission terminal may enter a timeout, that is, the transmission terminal may not transmit the packet during a specific period of time. When the timeout ends, the transmission terminal may not perform transmission again, due to a slow start. Additionally, when the ACK is not received again, another timeout may occur. As described above, since timeouts may consecutively occur, a period of the timeouts may be exponentially increased. When the above situation is repeated, a transmission efficiency may be reduced.

According to an embodiment, a transmission terminal may monitor a change in a multiplier of a specific flow. While monitoring the change in the multiplier, the transmission terminal may easily determine whether a transmission environment is deteriorated when the specific flow enters a timeout.

According to an embodiment, a transmission terminal may recognize a multiplier of a specific flow, using a parameter of a TCP stack in a kernel of an OS. For example, when the multiplier has a first numerical value, for example, "1," the transmission terminal may determine that a timeout does not occur. When the timeout occurs, the transmission terminal may determine that the multiplier increases. When the multiplier increases, the transmission terminal may determine that timeouts consecutively occur. For example, when the multiplier has a value of "2," the transmission terminal may determine that a single timeout occurs. When the multiplier has a value of "4," the transmission terminal may determine that two consecutive timeouts occur. When the multiplier has a value of "8," the transmission terminal may determine that three consecutive timeouts occur. Additionally, when a product of an RTO and a multiplier is less than a maximum value of a timeout, the transmission terminal may determine a linear relationship between the above-described multiplier and a timeout occurrence frequency.

Figure 6:
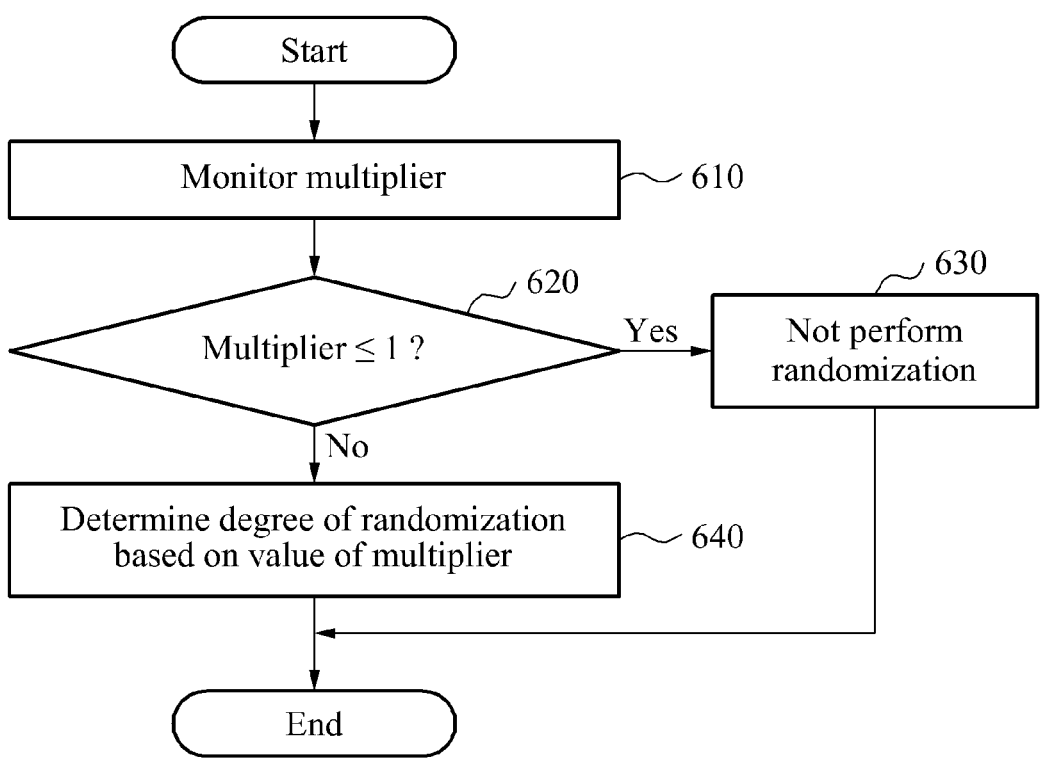
FIG. 6 is a flowchart illustrating a method of determining a degree of randomization according to an embodiment.

FIG. 6 is a flowchart illustrating a method of determining a degree of randomization according to an embodiment.

Referring to FIG. 6, in operation 610, a transmission terminal may monitor a multiplier. As described above, the transmission terminal may recognize a multiplier of a specific flow, using a parameter of a TCP stack in a kernel of an OS.

When the multiplier has a first numerical value, for example "1," in operation 620, the transmission terminal may not perform randomization in operation 630. The transmission terminal may determine that a timeout does not occur, and may set the degree of randomization to "0."

In operation 640, the transmission terminal may determine the degree of randomization based on a value of the multiplier. For example, when a product of the multiplier and an RTO is less than a maximum value of a timeout, the transmission terminal may increase the degree of randomization based on an increase in the multiplier. In other words, the transmission terminal may determine that a timeout occurrence frequency increases as the multiplier increases, and may increase the degree of randomization. One of ordinary skill in the art may easily understand that an increase range of the degree of randomization may not be limited and that the scope of the right may not be limited due to an increase in the degree of randomization.

Hereinafter, a randomization function may be implemented based on various embodiments.

In an example, the randomization function may be implemented in a TCP stack of a kernel of an OS. A transmission module may adjust a size of a payload of a packet using the randomization function in a transport layer, and may transmit the packet to a lower layer.

In this example, a segment size may also be randomized in the transport layer used for congestion control and accordingly, it is possible to implement randomization based on a variety of information. Additionally, it is possible to implement randomization by correcting a kernel (that is, software) of an OS.

In another example, the randomization function may be implemented in an offload engine of a network interface card (NIC). For example, when a TCP segmentation offload (TSO) is enabled, the NIC may receive, from an upper layer, a large segment having a size greater than the MSS, instead of receiving a segment having the MSS. The offload engine of the NIC may segment the received large segment. Accordingly, it is possible to minimize consumption of a CPU cycle and to randomize a size of a packet in hardware. Additionally, a transport layer may receive, from the NIC, a variety of information required to randomize a size of a packet, for example input parameters of a degree-of-randomization calculation module and a randomization module.

In still another example, the randomization function may be implemented in a software-defined router and/or switch. In this example, a randomization algorithm may be applied.

Figure 7:
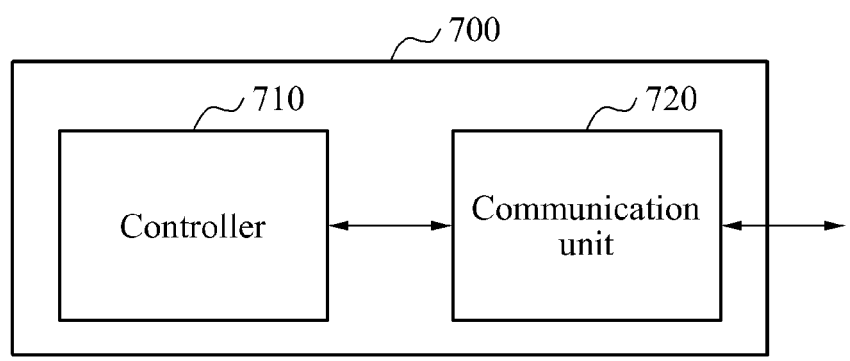
FIG. 7 is a block diagram illustrating a transmission node according to an embodiment.

FIG. 7 is a block diagram illustrating a transmission node 700 according to an embodiment.

The transmission node 700 may include a controller 710, and a communication unit 720.

The controller 710 may generate a packet that is to be transmitted by the communication unit 720. The controller 710 may generate a packet based on a preset protocol, and may determine a size of the packet. The controller 710 may recognize an MSS defined in advance for transmission and reception of the packet with a reception terminal. The controller 710 may randomize a size of a payload of the packet to be less than the MSS. The controller 710 may be implemented, for example, as an integrated circuit (IC) chip, a microprocessor, a minicomputer, and the like.

The communication unit 720 may transmit the packet having the randomized size to the reception terminal The communication unit 720 may include various communication modules, for example, an antenna, a demodulator, a modulator, a frequency processing apparatus, and a filter apparatus.

The controller 710 may determine a degree of randomization. In an example, the controller 710 may receive a parameter used to adjust the degree of randomization from an external source, and may operate in a manual mode to determine the degree of randomization. In another example, the controller 710 may operate in an automatic mode to determine a parameter used to adjust the degree of randomization.

The controller 710 may collect randomization-related information to determine the degree of randomization. The randomization-related information may be, for example, multiplier information, as described above. The controller 710 may collect the multiplier information, using a parameter of a TCP stack in a kernel of an OS.

The controller 710 may determine whether a timeout occurs during the transmission and reception of the packet, based on a change in the multiplier. When the multiplier has a first numerical value, the controller 710 may determine that the timeout does not occur. When the multiplier has a second numerical value, the controller 710 may determine that the timeout occurs. When a numerical value of the multiplier increases, the controller 710 may also determine that timeouts consecutively occur during the transmission and reception of the packet.

The controller 710 may determine the degree of randomization based on the numerical value of the multiplier. The degree of randomization may include at least one of a maximum randomized value, a minimum randomized value, an expected value of a randomized value, and a standard deviation of a distribution of randomized values.

During randomization of a size of a payload of the packet, the controller 710 may adjust the size of the payload through a randomization function in a transport layer. The communication unit 720 may transmit the packet of which the size of the payload is adjusted to a lower layer.

When a TSO is enabled, the controller 710 may segment a segment that has a size greater than the MSS and that is received from an upper layer.

The controller 710 may perform randomization based on a randomization algorithm in at least one of a router and a switch that are defined in software.

Figure 8A:
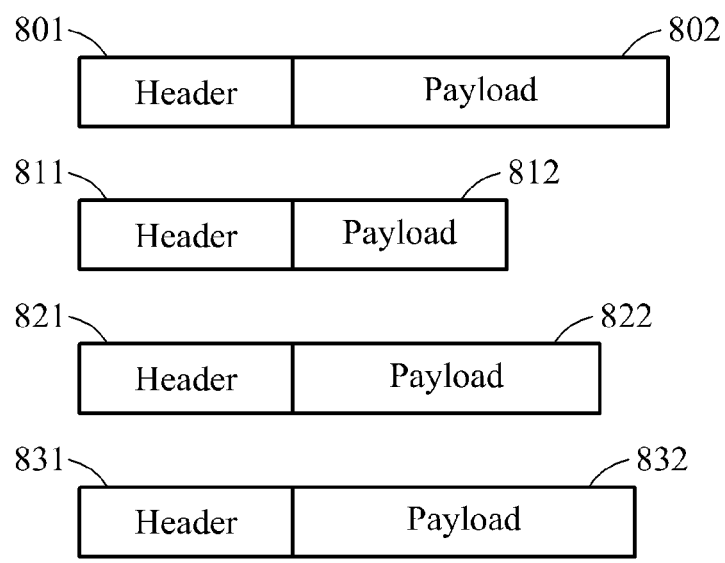
FIG. 8A is a diagram illustrating a randomized packet according to an embodiment.

FIG. 8A is a diagram illustrating a randomized packet according to an embodiment.

Figure 8B:
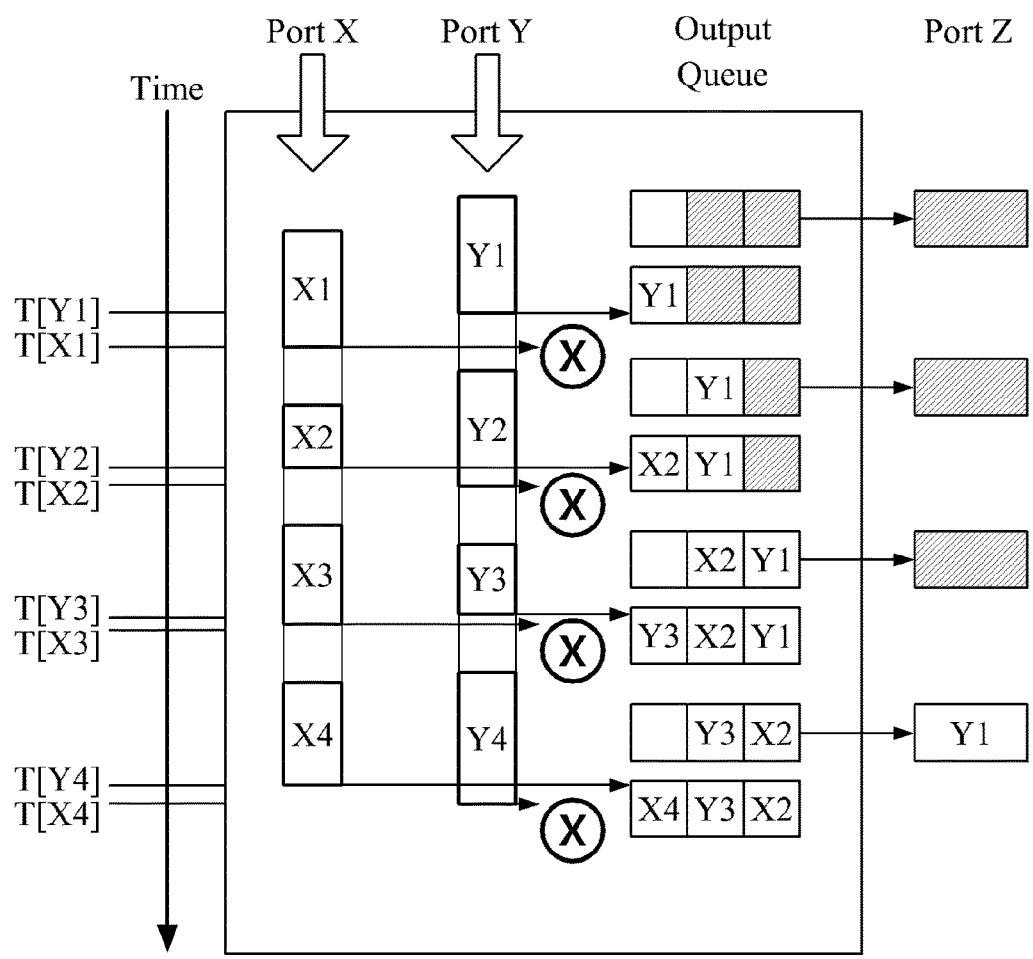
FIG. 8B is a diagram illustrating a flow processing enhancement based on application of a randomization method according to an embodiment.

As shown in FIG. 8A, a size of each of payloads 802, 812, 822 and 832 of first packets X1, X2, X3, and X4 may be randomized and accordingly, the first packets X1, X2, X3, and X4 may have different sizes. The first packets X1 to X4 may include headers 801, 811, 821, and 831, respectively. Randomization of a size of each of the payloads 802 to 832 of the first packets X1 to X4 of FIG. 8A has been described, however, this is merely an example. For example, in a randomization method according to an embodiment, a size of a portion of a header of the packet may be randomized FIG. 8B is a diagram illustrating a flow processing enhancement based on application of a randomization method according to an embodiment. Similarly to FIG. 2, FIG. 8B illustrates an ingress switch environment including two input ports, for example input ports X and Y, and a single output port, for example, a output port Z.

As shown in FIG. 8B, each of packets to which a randomization method according to various embodiments is applied, may have a random size. For example, a size of a payload of a packet may be set to be less than an MSS depending on embodiments, and accordingly each of first packets X1, X2, X3, and X4 and second packets Y1, Y2, Y3, and Y4 may have a random size.

Accordingly, processing of the first packets X1 to X4 input to the input port X, and the second packets Y1 to Y4 input to the input port Y, that is, output to the output port Z.

For example, referring to FIG. 8B, a size of the first packet X2 may be randomized to be less than a size of the second packet Y2. Accordingly, unlike the processing of FIG. 2, an arrival time T[X2] of the first packet X2 may be earlier than an arrival time T[Y2] of the second packet Y2, and the first packet X2, instead of the second packet Y2, may be input to an output queue. Accordingly, when the first packets X1 to X4 are synchronized slightly later than the second packets Y1 to Y4, the first packets X1 to X4 and the second packets Y1 to Y4 may be appropriately input to the output queue.

Figure 9:
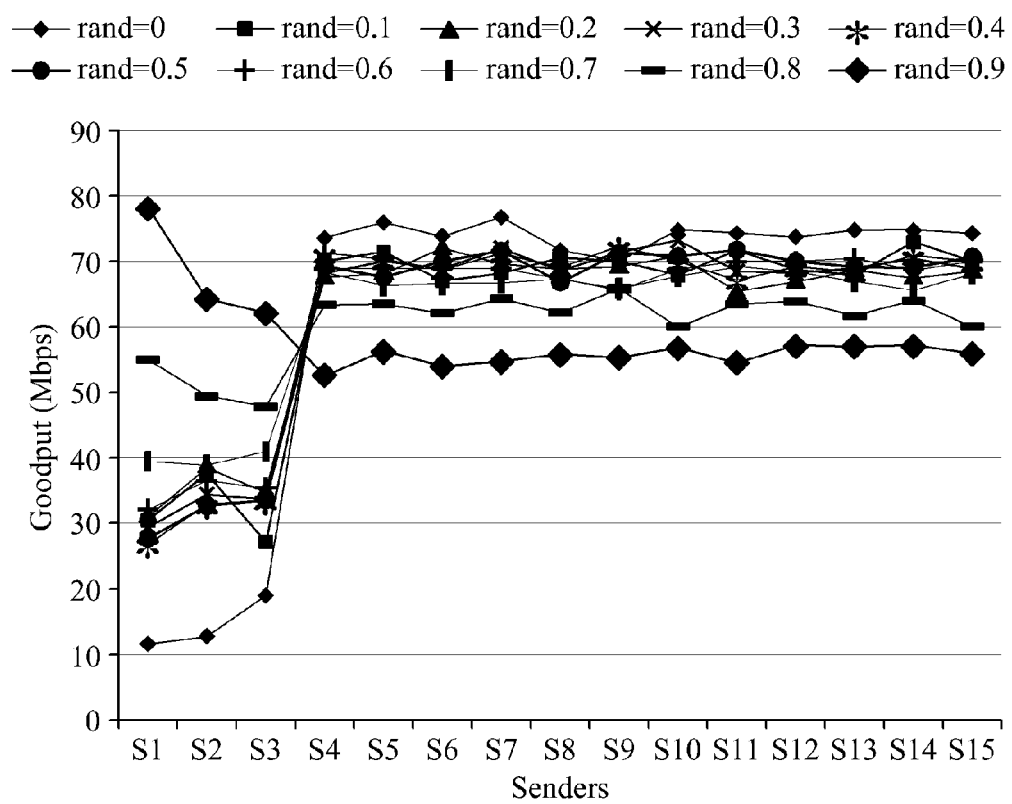
FIG. 9 is a graph illustrating a test result in a network simulation.

FIG. 9 is a graph illustrating a test result in a network simulation.

Referring to FIG. 9, when a packet size is not randomized, that is, when a degree of randomization rand is set to "0," a flow from S1 to R may have a lowest transmission performance. A flow from S2 to R, and a flow from S3 to R may have a second lowest transmission performance, and a third lowest transmission performance, respectively. However, when the degree of randomization rand is increased, for example, to a range of 0.8 to 0.9, all flows may have similar transmission performances.

The transmission terminal may collect a congestion window as randomization-related information, and may monitor the congestion window. For example, when a packet loss is detected, a TCP may reduce a congestion window through a congestion control algorithm. Until a next packet loss is detected immediately after the congestion window is reduced, the TCP may gradually increase the congestion window. The congestion window may be increased by an algorithm unique to an OS. When the congestion window is reduced immediately after a packet loss is detected, the transmission terminal may determine that a relatively low network congestion occurs, because the network congestion may be reduced due to a reduction in a sending rate by a flow that detects the packet loss. Conversely, when the congestion window is gradually increased, the transmission terminal may determine that the network congestion is increased.

Figure 10A:
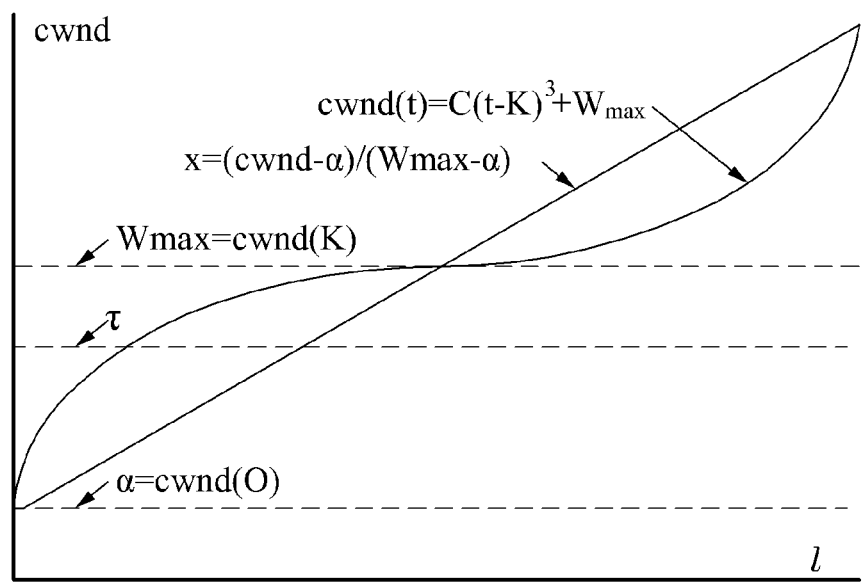
FIG. 10A is a graph illustrating a relationship between a time and a congestion window, in an example of CUBIC that is a congestion control algorithm used as a default in a Linux kernel.

Accordingly, the transmission terminal may determine the degree of randomization based on an increase and decrease in the congestion window. For example, FIG. 10A illustrates a relationship between a time t and a congestion window (cwnd), as an example of CUBIC that is a congestion control algorithm used as a default in a Linux kernel. As shown in FIG. 10A, the congestion window may increase over time.

Figure 10B:
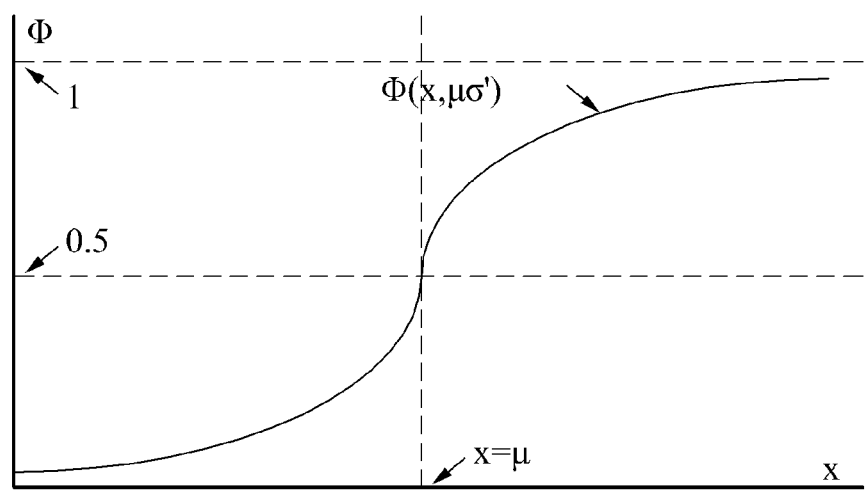
FIG. 10B is a graph illustrating a change in a degree of randomization of a transmission terminal, based on a congestion window situation of FIG. 10A.

The transmission terminal may determine the degree of randomization while monitoring the congestion window. For example, FIG. 10B is a graph illustrating a change in a degree of randomization of a transmission terminal, based on a congestion window situation of FIG. 10A. As shown in FIG. 10B, the transmission terminal may increase the degree of randomization based on an increase in the congestion window.

The above-described Linux environment of FIG. 10A is merely an example, and one of ordinary skill in the art may understand that the degree of randomization may be determined using a congestion window, regardless of a type of OSs. Additionally, the scope of the right may not be limited based to the type of OSs.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and to executed in a distributed fashion. The software and data may be stored by one or more non-transitory computer readable recording mediums.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A randomization method of a transmission terminal, the randomization method comprising:
    processing computer executable program code embodied in non-transitory computer readable storage media by one or more processors, the computer executable program code comprising:
    program code that recognizes by the transmission terminal, a maximum segment size (MSS) defined for transmission and reception of a packet with a reception terminal;
    program code that collects randomization-relation information comprising a multiplier used for backoff during retransmission timeout (RTO) of a transmission control protocol (TCP) to determine a degree of randomization; and
    program code that randomizes by the transmission terminal, a size of the packet using a degree of randomization, wherein the size of the packet is less than the MSS,
    wherein the program code that randomizes comprises program code that determines the degree of randomization based on the collected randomization-related information,
    wherein the degree of randomization includes at least one of a maximum randomized value, a minimum randomized value, an expected value of a randomized value, and a standard deviation of a distribution of randomized values,
    wherein the program code that randomizes comprises program code that identifies a relationship between the multiplier and a timeout occurrence frequency based on a comparison between a maximum value of a timeout and a product of the RTO and the multiplier, and
    wherein the degree of randomization is determined to be increased based on an increase in the multiplier when the product of the RTO and the multiplier is less than the maximum value of the timeout.

2. The randomization method of claim 1, wherein the program code that randomizes comprises program code that determines the degree of randomization.

3. The randomization method of claim 2, wherein the program code that determines the degree of randomization comprises program code that determines by the transmission terminal, a parameter used to adjust the degree of randomization.

4. The randomization method of claim 3, wherein the program code that determines a parameter comprises program code that collects multiplier information of a TCP stack in a kernel of an operating system (OS).

5. The randomization method of claim 3, wherein the program code that determines a parameter further comprises program code that determines whether a timeout occurs during the transmission and reception of the packet, based on a change in multiplier information of a TCP stack in a kernel of an operating system (OS).

6. The randomization method of claim 5, wherein the program code that determines whether a timeout occurs comprises program code that determines that the timeout does not occur when the multiplier information has a first numerical value, or that determines that the timeout occurs when the multiplier information has a second numerical value.

7. The randomization method of claim 6, wherein the program code that determines whether a timeout occurs comprises program code that determines that timeouts consecutively occur during the transmission and reception of the packet when a numerical value of the multiplier information increases.

8. The randomization method of claim 1, wherein the program code that determines that a loss occurs comprises program code that determines that the loss occurs when a numerical value of the congestion window information increases.

9. The randomization method of claim 6, wherein the program code that determines the degree of randomization comprises program code that determines the degree of randomization based on a numerical value of each of at least one of the multiplier information and the congestion window information.

10. The randomization method of claim 2, wherein the degree of randomization comprises at least one of a maximum randomized value, a minimum randomized value, an expected value of a randomized value, and a standard deviation of a distribution of randomized values.

11. The randomization method of claim 1, wherein the program code that randomizes comprises program code that adjusts a size of a payload of the packet through a randomization function in a transport layer.

12. The randomization method of claim 11, further comprising: program code that transmits the packet of which the size of the payload is adjusted to a lower layer.

13. The randomization method of claim 1, wherein the program code that randomizes comprises, when a TCP segmentation offload (TSO) is enabled, program code that segments a segment that has a size greater than the MSS and that is received from an upper layer.

14. The randomization method of claim 1, wherein the program code that randomizes comprises program code that performs randomization based on a randomization algorithm in at least one of a router and a switch that are defined in software or hardware.

15. A randomization method of a transmission terminal, the randomization method comprising:

processing computer executable program code embodied in non-transitory computer readable storage media by one or more processors, the computer executable program code comprising:

program code that monitors by the transmission terminal, at least one of congestion window information and multiplier information of a transmission control protocol (TCP) stack in a kernel of an operating system (OS), wherein the multiplier information is used for backoff during retransmission timeout (RTO) of a TCP;

program code that determines by the transmission terminal, whether a size of a packet transmitted to a reception terminal is to be randomized, based on a result of the monitoring;

program code that randomizes by the transmission terminal, a size of the packet using a degree of randomization, depending on a result of the determining; and program code that transmits from the transmission terminal, the packet having the randomized size to the reception terminal, wherein the degree of randomization includes at least one of a maximum randomized value, a minimum randomized value, an expected value of a randomized value, and a standard deviation of a distribution of randomized values wherein the program code that randomizes comprises:
program code that identifies a relationship between the multiplier and a timeout occurrence frequency based on a comparison between a maximum value of a timeout and a product of the RTO and the multiplier, and wherein the degree of randomization is determined to be increased based on an increase in the multiplier when the product of the RTO and the multiplier is less than the maximum value of the timeout.

16. A transmission terminal, comprising:

one or more processors that process computer executable program code embodied in non-transitory computer readable storage media, the computer executable program code comprising:

controller program code that recognizes a maximum segment size (MSS) defined for transmission and reception of a packet with a reception terminal, collects randomization-related information comprising a multiplier used for backoff during retransmission timeout (RTO) of a transmission control protocol (TCP) to determine a degree of randomization, and randomizes a size of the packet using a degree of randomization based on the collected randomization-related information, wherein the size of the packet is less than the MSS; and communication program code that transmits the packet having the randomized size to the reception terminal, wherein the degree of randomization includes at least one of a maximum randomized value, a minimum randomized value, an expected value of a randomized value, and a standard deviation of a distribution of randomized values, wherein the controller program code further comprises:
program code that identifies a relationship between the multiplier and a timeout occurrence frequency based on a comparison between a maximum value of a timeout and a product of the RTO and the multiplier, and wherein the degree of randomization is determined to be increased based on an increase in the multiplier when the product of the RTO and the multiplier is less than the maximum value of the timeout.

* * * * *